United States Patent
Agrawal et al.

(10) Patent No.: US 6,873,606 B2
(45) Date of Patent: Mar. 29, 2005

(54) RATE ADAPTIVE TRANSMISSION SCHEME FOR MIMO SYSTEMS

(75) Inventors: Avneesh Agrawal, San Jose, CA (US); Rajiv Vijayan, San Diego, CA (US); Tamer Kadous, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 10/367,234

(22) Filed: Feb. 14, 2003

(65) Prior Publication Data

US 2004/0076124 A1 Apr. 22, 2004

Related U.S. Application Data

(60) Provisional application No. 60/419,319, filed on Oct. 16, 2002.

(51) Int. Cl.[7] ................................................. H04B 1/02
(52) U.S. Cl. ....................................... 370/310; 375/267
(58) Field of Search ................................ 370/310, 328, 370/329, 464, 465, 203, 210; 375/267, 347; 455/101, 103

(56) References Cited

U.S. PATENT DOCUMENTS

| | | | |
|---|---|---|---|
| 2003/0003863 A1 * | 1/2003 | Thielecke et al. ............. | 455/39 |
| 2003/0076797 A1 * | 4/2003 | Lozano ........................ | 370/334 |
| 2003/0186650 A1 * | 10/2003 | Liu .............................. | 455/25 |
| 2003/0218973 A1 * | 11/2003 | Oprea et al. ................. | 370/210 |
| 2004/0023621 A1 * | 2/2004 | Sugar et al. ................. | 455/103 |

OTHER PUBLICATIONS

Pitas et al. "Multichannel Transforms for Signal/Image Processing". IEEE. Oct. 1996. pp. 1402–1413.*
Miller et al. "Digital Prefiltering for Multiple–input, Multiple–Output Receivers". IEEE. 2001. pp. 1696–1699.*
Nam et al. "Transmit Power Allocation for an Extended V–Blast System". IEEE. Sep. 15–18, 2002. pp. 843–848.*

* cited by examiner

*Primary Examiner*—Chi Pham
*Assistant Examiner*—Derrick W. Ferris
(74) *Attorney, Agent, or Firm*—Sandip (Micky) Minhas; Philip Wadsworth

(57) ABSTRACT

A rate adaptive transmission scheme for MIMO systems, which can transmit a variable number of data symbol streams, provide transmit diversity for each data symbol stream, and fully utilize the total transmit power of the system and the full power of each antenna. In one method, at least one data symbol stream is received for transmission from a plurality of antennas. Each data symbol stream is scaled with a respective weight corresponding to the amount of transmit power allocated to that stream. The scaled data symbol stream(s) are multiplied with a transmit basis matrix to provide a plurality of transmit symbol streams for the plurality of antennas. The transmit basis matrix (e.g., a Walsh-Hadamard matrix or a DFT matrix) is defined such that each data symbol stream is transmitted from all antennas and each transmit symbol stream is transmitted at (or near) the full power for the associated antenna.

22 Claims, 4 Drawing Sheets

RATE ADAPTIVE TRANSMISSION SCHEME FOR MIMO SYSTEMS

This application claims the benefit of provisional U.S. Application Serial No. 60/419,319, entitled "MIMO Signaling Schemes for Rate Adaptive Systems," filed Oct. 16, 2002, assigned to the assignee of the present application, and incorporated herein by reference in its entirety for all purposes.

BACKGROUND

I. Field of the Invention

The present invention relates generally to data communication, and more specifically to a rate adaptive transmission scheme for multiple-input multiple-output (MIMO) communication systems.

II. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, where $N_S \leq \min \{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In a wireless communication system, data to be transmitted is typically processed (e.g., coded and modulated) to provide data symbols. For a MIMO system, one or multiple streams of data symbols may be sent from a transmitter to a receiver. Multiple data symbol streams may be transmitted in parallel from multiple transmit antennas using spatial multiplexing, which exploits the additional dimensionalities of the MIMO channel. To attain high throughput, it is desirable to transmit as many data symbol streams in parallel as possible. However, the number of data symbol streams that may be transmitted and the rates that may be used for these streams are typically dependent on the channel condition. Various transmission schemes for spatial multiplexing are currently available, including (1) an "antenna multiplexing" scheme that transmits one data symbol stream from each antenna and (2) an "eigenmode multiplexing" scheme that transmits one data symbol stream on each independent channel of the MIMO channel.

Alternatively, a single data symbol stream may be transmitted from multiple transmit antennas using transmit diversity to increase reliability of the data transmission. Diversity is achieved by the use of multiple transmit antennas as well as multiple receive antennas to provide a number of propagation paths for the data symbol stream. Transmit diversity may be used if greater reliability is desired or if the channel condition is so poor that it is better to use all of the available transmit power for one data symbol stream. Various transmission schemes for transmit diversity are currently available, including (1) a "space-time diversity" scheme described by S. M. Alamouti in a paper entitled "A Simple Transmit Diversity Technique for Wireless Communications," IEEE JSAC, October 1998, and (2) a "delay diversity" scheme described by B. Raghothaman et al. in a paper entitled "Performance of Closed Loop Transmit Diversity with Feedback Delay," Thirty-Fourth Asilomar Conference on Signals, Systems and Computers, 2000.

To achieve high performance, a MIMO system may be designed to support one or more transmission schemes for spatial multiplexing and one or more transmission schemes for transmit diversity. For such a MIMO system, in any given transmission interval, a specific transmission scheme may be selected for use depending on the channel condition and the desired result (e.g., higher throughput or greater reliability). However, conventional transmission schemes for spatial multiplexing are often quite different in design from conventional transmission schemes for transmit diversity. Thus, the complexity of the transmitter and receiver in the system may be greatly increased if they are required to support multiple (and different) transmission schemes for spatial multiplexing and transmit diversity. Moreover, for high performance, it is desirable to fully utilize the total transmit power available for the system and the full power available for each of the $N_T$ transmit antennas for data transmission, regardless of the number of data symbol streams being transmitted.

There is therefore a need in the art for a transmission scheme that can support spatial multiplexing, provide transmit diversity, and fully utilize the available transmit power in MIMO systems.

SUMMARY

A rate adaptive transmission scheme that supports spatial multiplexing and provides transmit diversity for MIMO systems is provided herein. The rate adaptive transmission scheme has a number of desirable characteristics, including: (1) support transmission of a variable number of data symbol streams, thus making it suitable for use in rate adaptive systems, (2) provide transmit diversity for each data symbol stream, and (3) allow the full power available for each transmit antenna to be used for data transmission regardless of the number of data symbol streams being transmitted, thus making it power efficient. The rate adaptive transmission scheme is well suited for single-carrier MIMO systems and may also be used for multi-carrier MIMO systems.

In an embodiment, a method is provided for processing data for transmission in a MIMO system. In accordance with the method, at least one stream of data symbols is received for transmission from a plurality of transmit antennas. Each data symbol stream is scaled with a respective weight corresponding to the amount of transmit power allocated to that data symbol stream. The total amount of transmit power allocated to all of the at least one data symbol stream is less than or equal to the total transmit power available for the system. The scaled data symbol stream(s) are then multiplied with a transmit basis matrix to provide a plurality of streams of transmit symbols, one transmit symbol stream for each transmit antenna.

The transmit basis matrix is defined such that (1) each data symbol stream is transmitted from the plurality of transmit antennas and (2) each transmit symbol stream is transmitted at (or near) the full power available for the associated antenna. The transmit basis matrix may be a Walsh-Hadamard matrix, a discrete Fourier transform (DFT) matrix, or some other matrix.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
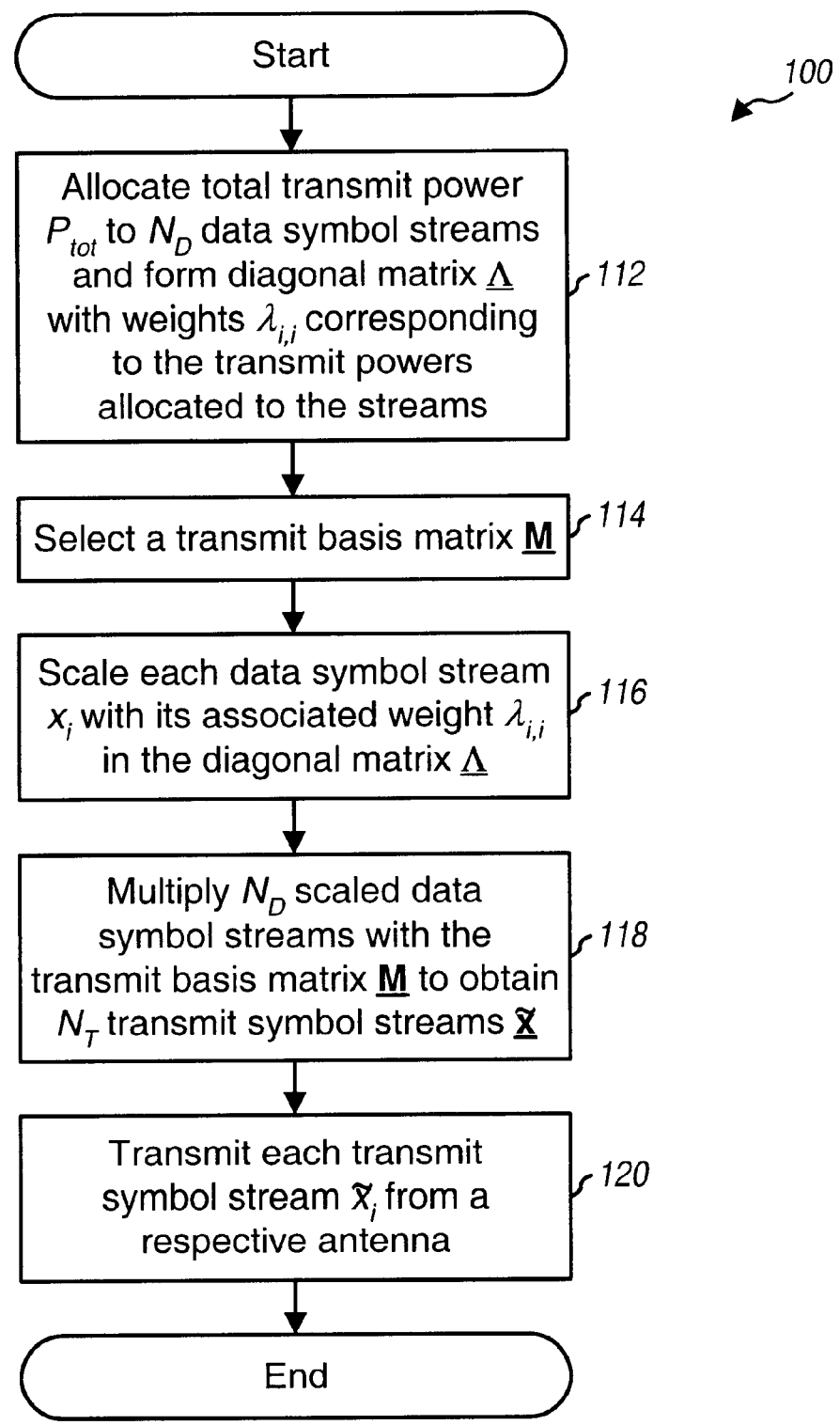
FIG. 1 shows a flow diagram of a process for transmitting $N_D$ data symbol streams from $N_T$ antennas using the rate adaptive transmission scheme.

A rate adaptive transmission scheme for MIMO systems is described herein. For a multi-carrier MIMO system, the transmission scheme may be used for each of the multiple carriers available for data transmission. For clarity, the rate adaptive transmission scheme is described below for a single-carrier MIMO system.

For a single-carrier MIMO system, the MIMO channel formed by the $N_T$ transmit and $N_R$ receive antennas may be decomposed into $N_S$ independent channels, with $N_S \leq \min\{N_T, N_R\}$. The number of independent channels is determined by the number of eigenmodes for the MIMO channel, which in turn is dependent on a channel response matrix $\underline{H}$ that describes the response between the $N_T$ transmit and $N_R$ receive antennas. For simplicity, the description below assumes that $N_T \leq N_R$ and that the channel response matrix $\underline{H}$ is full rank (i.e., $N_S = N_T \leq N_R$). With these assumptions, for each symbol period, up to $N_T$ symbols may be transmitted in parallel from the $N_T$ transmit antennas.

The model for a single-carrier MIMO system may be expressed as:

$$\underline{y} = \underline{H}\underline{x} + \underline{n} \qquad \text{Eq(1)}$$

where $\underline{x}$ is an $\{N_T \times 1\}$ "data" vector with $N_T$ entries for the data symbols to be transmitted from the $N_T$ transmit antennas;

$\underline{y}$ is an $\{N_R \times 1\}$ "receive" vector with $N_R$ entries for the symbols received via the $N_R$ receive antennas;

$\underline{H}$ is the $\{N_R \times N_T\}$ channel response matrix; and $\underline{n}$ is a vector of additive white Gaussian noise (AWGN).

The data vector $\underline{x}$ is assumed to be such that $E[\underline{x}\underline{x}^H] = \underline{I}$, where E is the expectation operation, "$^H$" is the conjugate transpose, and $\underline{I}$ is the identity matrix with ones along the diagonal and zeros everywhere else. The vector $\underline{n}$ is assumed to have zero mean and a covariance matrix of $\underline{\Lambda}_n = \sigma^2 \underline{I}$, where $\sigma^2$ is the variance of the noise.

In a typical system, there are constraints on (1) the total transmit power, $P_{tot}$, that may be used for all $N_T$ transmit antennas and (2) the maximum or full power, $P_{ant}$, for each transmit antenna. Typically, the per-antenna power $P_{ant}$ is given as $P_{ant} = P_{tot}/N_T$. These constraints may be imposed by (1) limitation of the power amplifier used to drive each transmit antenna, (2) regulatory requirements, and (3) possibly other factors. The model for a MIMO system with these power constraints may then be expressed as:

$$\underline{y} = \sqrt{\frac{P_{tot}}{N_T}} \underline{H}\underline{x} + \underline{n}, \qquad \text{Eq (2)}$$

where $\sqrt{P_{tot}/N_T}$ is a scaling factor that accounts for the total and per-antenna power constraints.

In one conventional transmission scheme, $N_D$ data symbol streams are transmitted concurrently from the $N_T$ transmit antennas using antenna multiplexing, where $N_D$ may be any integer from 1 to $N_T$ (i.e., $N_T \geq N_D \geq 1$). For this conventional transmission scheme, in any given symbol period, $N_D$ data symbols are transmitted simultaneously from $N_D$ antennas, and the $(N_T - N_D)$ remaining antennas are not used. If the total transmit power and the per-antenna power are constrained as described above, then this transmission scheme will exhibit a power loss if fewer than $N_T$ antennas are used for data transmission, which is the case if $N_D < N_T$. Because of the per-antenna power constraint, more of the total transmit power $P_{tot}$ cannot be allocated to the $N_D$ antennas used for data transmission when $N_D < N_T$. Moreover, if the $N_D$ data symbol streams are redundant (i.e., the same) streams, then there is a risk of cancellation of these streams at the receiver.

The specific number of data symbol streams to transmit may be dependent on various factors such as, for example, the channel condition, the amount of data to transmit, and so on. As noted above, different independent channels may experience different channel conditions and achieve different signal-to-noise ratios (SNRs). For a rank deficient MIMO channel, the optimal strategy is to transmit fewer than $N_T$ data symbol streams but allocate more of the total transmit power $P_{tot}$ to the data symbol streams that achieve higher SNRs. However, for the antenna multiplexing transmission scheme described above whereby each data symbol stream is transmitted from one antenna, the optimal allocation of the total transmit power cannot be achieved because of the per-antenna power constraint. As a result, some loss in performance will occur.

The rate adaptive transmission scheme described herein supports spatial multiplexing, provides transmit diversity, and has the following beneficial features:

- Support the transmission of a variable number of data symbol streams (from one to $N_T$) using the same transmit and receive spatial processing while retaining key characteristics.
- Provide better performance than the space-time diversity scheme for a single data symbol stream via transmission from all $N_T$ transmit antennas.
- Allow the full power $P_{ant}$ of each of the $N_T$ transmit antennas to be used for data transmission, regardless of the number of data symbol streams being transmitted, thus making it power efficient with no power loss when fewer than $N_T$ data symbol streams are being transmitted.
- Allow for flexible allocation of the total transmit power $P_{tot}$ among the data symbol streams being transmitted.

The rate adaptive transmission scheme and its beneficial features are described in further detail below.

The general model for a single-carrier MIMO system and applicable for the rate adaptive transmission scheme may be expressed as:

$$\underline{y} = \underline{H}\underline{M}\underline{\Lambda}\underline{x} + \underline{n} = \underline{H}_{\mathit{eff}}\underline{\Lambda}\underline{x} + \underline{n} = \underline{H}\underline{\tilde{x}} + \underline{n}, \qquad \text{Eq(3)}$$

where $\underline{M}$ is an $\{N_T \times N_T\}$ transmit basis matrix, which is a unitary matrix;

$\underline{\Lambda}$ is an $\{N_T \times N_T\}$ diagonal matrix;

$\underline{\tilde{x}}$ is an $\{N_T \times 1\}$ "transmit" vector with $N_T$ entries for $N_T$ transmit symbols sent from the $N_T$ transmit antennas; and $\underline{H}_{\mathit{eff}}$ is an "effective" channel response matrix, which is defined as $\underline{H}_{\mathit{eff}} = \underline{H}\underline{M}$.

A unitary matrix $\underline{U}$ is characterized by the property $\underline{U}^H\underline{U} = \underline{I}$, which indicates that each column of the unitary matrix is orthogonal to all other columns of the matrix, and each row of the unitary matrix is also orthogonal to all other rows. The diagonal matrix $\underline{\Lambda}$ contains non-negative real values along the diagonal and zeros everywhere else. These diagonal entries are indicative of the amount of transmit power allocated to the $N_D$ data symbol streams being transmitted.

As described in further detail below, the diagonal matrix $\underline{\Lambda}$ may be used to allocate different transmit powers to the $N_D$ data symbol streams while conforming to the total transmit power constraint of $P_{tot}$. The transmit basis matrix $\underline{M}$ allows each data symbol stream to be sent from $N_T$ transmit antennas and further allows the full power $P_{ant}$ of each transmit antenna to be utilized for data transmission.

From equation (3), the transmit vector $\underline{\tilde{x}}$ may be expressed as:

$$\underline{\tilde{x}} = \underline{M}\underline{\Lambda}\underline{x}. \qquad \text{Eq(4)}$$

The transmit symbol $\tilde{x}_k$ for the k-th transmit antenna (i.e., the k-th element of the transmit vector $\underline{\tilde{x}}$) may be expressed as:

$$\tilde{x}_k = \sum_{i=1}^{N_T} M_{k,i} \cdot \lambda_{i,i} \cdot x_i, \text{ for } k \in K, \qquad \text{Eq (5)}$$

where $M_{k,i}$ is the element in the k-th row and i-th column of the transmit basis matrix $\underline{M}$;

$\lambda_{i,i}$ is the i-th diagonal element of the matrix $\underline{\Lambda}$;

$x_i$ is i-th element of the data vector $\underline{x}$;

$\tilde{x}_k$ is the k-th element of the transmit vector $\underline{\tilde{x}}$; and K is the set of all transmit antennas (i.e., $K = \{1, 2, \ldots, N_T\}$).

Equation (3) represents the general model that covers both equations (1) and (2). This is achieved by properly defining the transmit basis matrix $\underline{M}$ and the diagonal matrix $\underline{\Lambda}$. For example, equation (3) can be made equal to equation (2) by (1) defining the transmit basis matrix $\underline{M}$ as $\underline{M} = [\underline{m}_1, \underline{m}_2, \ldots, \underline{m}_{N_T}]$, where $\underline{m}_i$ is an $\{N_T \times 1\}$ "index" vector for the i-th column of $\underline{M}$ and is defined with "1" at the i-th position and "0" elsewhere, and (2) defining the diagonal matrix $\underline{\Lambda}$ as $\underline{\Lambda} = \sqrt{P_{tot}/N_T}\underline{I}$. However, other beneficial characteristics may be obtained by defining the transmit basis matrix $\underline{M}$ and the diagonal matrix $\underline{\Lambda}$ in some other manner, as described below.

For the following analysis, consider an arbitrary transmit basis matrix $\underline{M}$ and an arbitrary diagonal matrix $\underline{\Lambda}$ with non-negative diagonal entries. The transmit power for the vector $\underline{x}$ is equal to the sum of the square of the diagonal elements of $\underline{\Lambda}$. The total transmit power constraint may then be expressed as:

$$\text{trace } (\underline{\Lambda}^2) \leq P_{tot}. \qquad \text{Eq(6)}$$

From equation (5), the transmit power for each of the $N_T$ transmit antennas may be expressed as:

$$E[\tilde{x}_k \cdot \tilde{x}_k^*] = \sum_{i=1}^{N_T} |M_{k,i}|^2 \cdot \lambda_{i,i}^2, \text{ for } k \in K, \qquad \text{Eq (7)}$$

where "*" denotes the complex conjugate. The per-antenna power constraint may then be expressed as:

$$\sum_{i=1}^{N_T} |M_{k,i}|^2 \cdot \lambda_{i,i}^2 \leq P_{ant} = \frac{P_{tot}}{N_T}, \text{ for } k \in K. \qquad \text{Eq (8)}$$

Since trace $(\underline{\Lambda}^2) \leq P_{tot}$ as shown in equation (6), the per-antenna power constraint in equation (8) may be satisfied by any full rank matrix $\underline{M}$ whose elements satisfy the following:

$$|M_{k,i}|^2 = \frac{1}{N_T}, \text{ for } i \in K \text{ and } k \in K. \qquad \text{Eq (9)}$$

Equation (9) indicates that the elements of a valid matrix $\underline{M}$ have magnitude equal to $1/\sqrt{N_T}$. Equation (9) represents a sufficient condition (but not a necessary condition) needed to satisfy the per-antenna power constraint.

The matrix $\underline{M}$ may be defined in various manners while satisfying the per-antenna power constraint. In one embodiment, the matrix $\underline{M}$ is defined as:

$$\underline{M} = \frac{1}{\sqrt{N_T}} \underline{W}, \qquad \text{Eq (10)}$$

where $\underline{W}$ is a Walsh-Hadamard matrix. As illustration, for $N_T = 4$, the Walsh-Hadamard matrix $\underline{W}_{4 \times 4}$ may be expressed as:

$$\underline{W}_{4\times 4} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}. \qquad \text{Eq (11)}$$

A larger size Walsh-Hadamard matrix $\underline{W}_{2N \times 2N}$ may be defined as:

$$\underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}. \qquad \text{Eq (12)}$$

In another embodiment, the matrix $\underline{M}$ is defined as:

$$\underline{M} = \frac{1}{\sqrt{N_T}} \underline{Q}, \qquad \text{Eq (13)}$$

where $\underline{Q}$ is a discrete Fourier transform (DFT) matrix. As illustration, for $N_T = 4$, the DFT matrix $\underline{Q}_{4 \times 4}$ may be expressed as:

$$\underline{Q}_{4\times 4} = \begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}. \qquad \text{Eq (14)}$$

In general, an $N \times N$ DFT matrix $\underline{Q}_{N \times N}$ may be defined such that the (k,i)-th entry, $$q_{k,i}^N = e^{-j2\pi \frac{(k-1)(i-1)}{N}}, \text{ for } k = \{1 \ldots N\} \text{ and } i = \{1 \ldots N\}, \qquad \text{Eq (15)}$$

is given as:

$$q_{k,i}^N,$$

where k is the row index and i is the column index for the matrix $\underline{Q}_{N \times N}$. The matrix $\underline{M}$ may also be defined with various other matrices, and this is within the scope of the invention.

By using an appropriate transmit basis matrix $\underline{M}$ and an appropriate diagonal matrix $\underline{\Lambda}$, the total transmit power constraint and the per-antenna power constraint can both be satisfied. In particular, the total transmit power constraint may be satisfied by defining the diagonal elements of $\underline{\Lambda}$ such that equation (6) is satisfied. The per-antenna power constraint may then be satisfied by defining the elements of $\underline{M}$ such that equation (9) is satisfied. Each diagonal element $\lambda_{i,i}$ in $\underline{\Lambda}$ is indicative of the amount of transmit power to use for an associated data symbol stream $x_i$. Since there is no constraint on the value of any individual diagonal element of $\underline{\Lambda}$, except that $\lambda_{i,i}^2 \leq P_{tot}$, the total transmit power $P_{tot}$ may be allocated to the $N_D$ data symbol streams in various manners while still satisfying the total transmit power and the per-antenna power constraints. This then affords great flexibility in allocating the available transmit power among the $N_D$ data symbol streams.

The rate adaptive transmission scheme may be used to transmit any number of data symbol streams (i.e., $N_D$ may be any value from 1 to $N_T$). The transmitter performs the spatial processing shown by equation (4) regardless of the number of data symbol streams being transmitted. The data vector $\underline{x}$ includes $N_D$ non-zero entries for the $N_D$ data symbol streams and $N_T$–$N_D$ zero entries. Each of the $N_D$ data symbol streams is associated with a respective non-zero diagonal element in the matrix $\underline{\Lambda}$. Each of the $N_D$ data symbol streams is further processed using a respective row of the transmit basis matrix $\underline{M}$ for transmission on a respective spatial channel, which is defined by a specific column or eigenvector of the effective channel response matrix $\underline{H}_{eff}$.

It can be shown that the rate adaptive transmission scheme can provide improved performance over conventional transmit diversity schemes. For example, the space-time diversity scheme described by S. M. Alamouti is often used to transmit a single data symbol stream from a single pair of transmit antennas to achieve transmit diversity. However, it can be shown that the rate adaptive transmission scheme can provide improved performance for the transmission of the single data symbol stream. The received SNR, $SNR_{ra}$, for the data symbol stream transmitted using the rate adaptive transmission scheme with the best column of $\underline{H}_{eff}$ may be expressed as:

$$SNR_{ra} \propto \max_i \{(\|\underline{h}_{eff,i}\|^2) \cdot P_{tot}\}, \quad \text{Eq (16)}$$

where "$\propto$" denotes proportionality; and
$\|\underline{h}_{eff,i}\|^2$ is the 2-norm of $\underline{h}_{eff,i}$, which is the i-th column or eigenvector of the effective channel response matrix $\underline{H}_{eff}$.

Equation (16) indicates that the SNR of the single best data symbol stream using the rate adaptive transmission scheme is proportional to the 2-norm of the best eigenvector of $\underline{H}_{eff}$. To obtain the SNR of equation (16), the receiver would need to send back information indicating the best column of $\underline{H}_{eff}$ for use by the transmitter.

The received SNR, $SNR_{st}$, for the single data symbol stream transmitted using the space-time diversity scheme may be expressed as:

$$SNR_{st} \propto \sum_{i=1}^{N_T} (\|\underline{h}_{eff,i}\|^2) \cdot \frac{P_{tot}}{N_T}. \quad \text{Eq (17)}$$

Equation (17) indicates that the SNR of the single data symbol stream using the space-time diversity scheme is proportional to the average of the 2-norms of the $N_T$ eigenvectors of $\underline{H}_{eff}$. Equations (16) and (17) both assume transmission at full rate (i.e., without rate loss). However, since the space-time diversity scheme uses only two antennas for transmitting the single data symbol stream, if $N_T$<2 then there will be a rate loss.

It is well known that the following expression is always true:

$$\max_i \{\|\underline{h}_{eff,i}\|^2\} \geq \frac{1}{N_T} \sum_{i=1}^{N_T} \|\underline{h}_{eff,i}\|^2, \quad \text{Eq (18a)}$$

and thus $$SNR_{ra} \geq SNR_{st} \quad \text{Eq(18b)}$$

Equations (18a) and (18b) indicate that the rate adaptive transmission scheme can provide the same or better performance than the space-time diversity scheme. Moreover, the rate adaptive transmission scheme can provide greater transmit diversity since the data symbol stream is transmitted from all $N_T$ antennas. In contrast, the space-time diversity scheme transmits the single data symbol stream from only one pair of transmit antennas. Transmission of the single data symbol stream over multiple pairs of antennas may be possible for the space-time diversity scheme but may result in a rate loss or some other performance penalty.

It should also be noted that the use of the transmit basis matrix $\underline{M}$ by the rate adaptive transmission scheme allows for full utilization of both the total transmit power $P_{tot}$ and the per-antenna power $P_{ant}$ for data transmission, regardless of the number of data symbol stream being transmitted. If the transmit basis matrix $\underline{M}$ is not used (i.e., if $\underline{M}=\underline{I}$) and a single data symbol stream is transmitted from the single best antenna using antenna multiplexing, then the received SNR for this data symbol stream may be expressed as:

$$SNR_{am} \propto \max_i \{(\|\underline{h}_i\|^2) \cdot \frac{P_{tot}}{N_T}\}. \quad \text{Eq (19)}$$

It can also be shown that the following expression is also always true:

$$\max_i \{\|\underline{h}_{eff,i}\|^2\} \geq \frac{1}{N_T} \max_i \{\|\underline{h}_i\|^2\}. \quad \text{Eq (20)}$$

Thus, the rate adaptive transmission scheme also outperforms the antenna multiplexing transmission scheme.

FIG. 1 shows a flow diagram of an embodiment of a process 100 for transmitting $N_D$ data symbol streams from $N_T$ antennas using the rate adaptive transmission scheme. As noted above, $N_D$ may be any value from 1 to $N_T$ (i.e., $N_T \geq N_D \geq 1$).

Initially, the total transmit power $P_{tot}$ is allocated to the $N_D$ data symbol streams (denoted by $\underline{x}$) (step 112). The specific number of data symbol streams to transmit and the amount of power to allocate to each data symbol stream may both be determined based on the channel condition. For example, a "water-filling" procedure may be used to determine the number of data symbol streams to transmit and the amount of power to use for each data symbol stream such that the overall throughput is maximized. Water-filling is described in detail in commonly assigned U.S. patent application Ser. No. 10/056,275, entitled "Reallocation of Excess Power for Full Channel-State Information (CSI) Multiple-Input, Multiple-Output (MIMO) Systems," filed Jan. 23, 2002, and by Robert G. Gallager in "Information Theory and Reliable Communication," John Wiley and Sons, 1968, both of which are incorporated herein by reference.

The amount of transmit power allocated to each data symbol stream $x_i$ is denoted by a respective weight $\lambda_{i,i}$. The $N_T$ diagonal elements of the matrix $\underline{\Lambda}$ are composed of $N_D$ weights for the $N_D$ data symbol streams and $(N_T-N_D)$ zeros. The total amount of transmit power allocated to the $N_D$ data symbol streams is less than or equal to the total transmit power of the system $$\left(i.e., \sum_{i=1}^{N_T} \lambda_{i,i}^2 \le P_{tot}\right).$$

A transmit basis matrix $\underline{M}$ is next selected for use (step 114). The transmit basis matrix $\underline{M}$ may be defined such that each data symbol stream is transmitted from all $N_T$ antennas and the full power of each antenna is used for data transmission. The transmit basis matrix $\underline{M}$ may be defined as (1) the Walsh-Hadamard matrix $\underline{W}$ described in equations (10) through (12), (2) the DFT matrix described in equations (13) through (15), or (3) some other matrix.

Each data symbol stream $x_i$ is then scaled with its associated weight $\lambda_{i,i}$ in the diagonal matrix $\underline{\Lambda}$ (step 116). This scaling results in each data symbol stream being transmitted with its allocated power. The $N_D$ scaled data symbol streams are then multiplied with the transmit basis matrix $\underline{M}$ to obtain $N_T$ transmit symbol streams (denoted by $\underline{\tilde{x}}$) for the $N_T$ transmit antennas (step 118). The scaling of the $N_D$ data symbol streams with the diagonal matrix $\underline{\Lambda}$ and the multiplication with the transmit basis matrix $\underline{M}$ are shown in equation (4). Each transmit symbol stream $\tilde{x}_k$ is further processed and then transmitted from an associated antenna (step 120).

Figure 2:
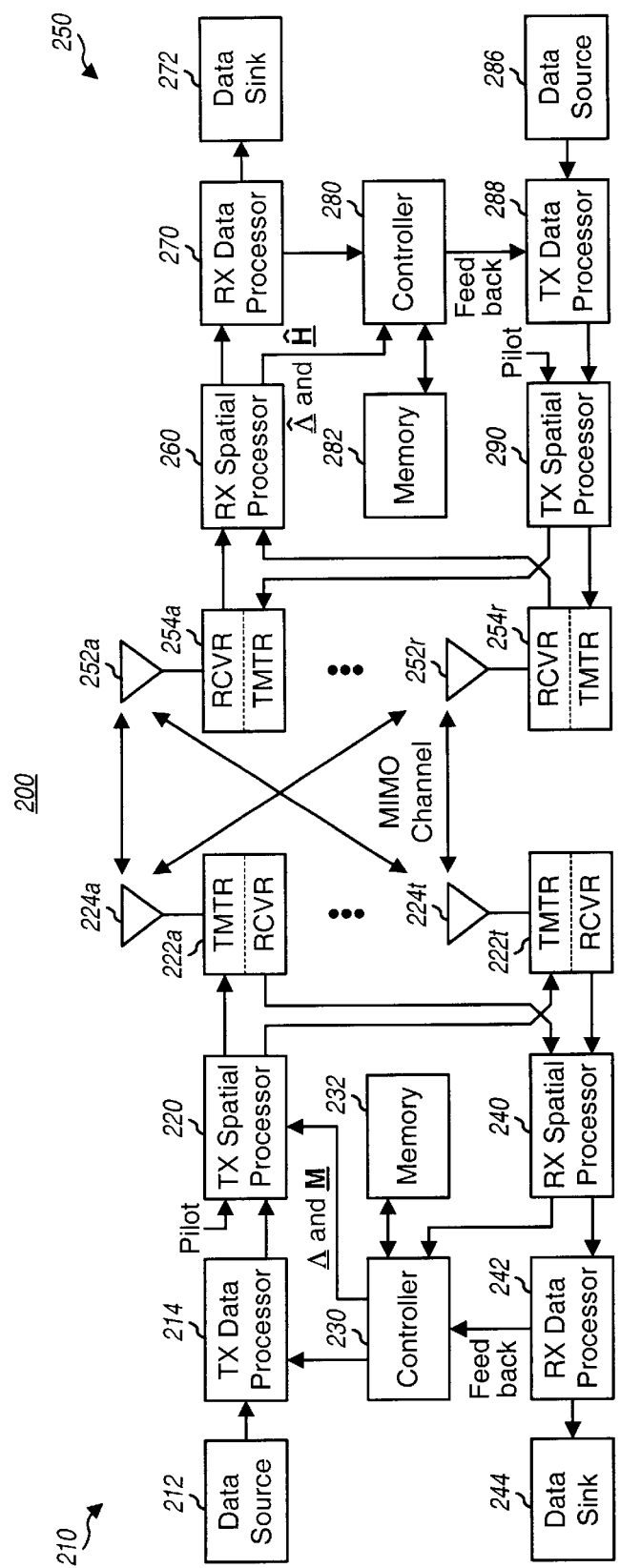
FIG. 2 shows a block diagram of a transmitter system and a receiver system in a MIMO system.

FIG. 2 shows a block diagram of an embodiment of a transmitter system 210 and a receiver system 250 in a MIMO system 200. At transmitter system 210, data for $N_D$ streams is provided by a data source 212 and coded and modulated by a transmit (TX) data processor 214 to provide modulation symbols, which are also referred to as data symbols. The data rate, coding, and modulation for each stream may be determined by controls provided by a controller 230. The data symbols are further scaled with the diagonal matrix $\underline{\Lambda}$ and spatially processed with the transmit basis matrix $\underline{M}$ by a TX spatial processor 220 to provide transmit symbols. Pilot symbols, which may be used for channel estimation, are multiplexed with the transmit symbols. One stream of multiplexed transmit and pilot symbols is provided to, and processed by, each transmitter (TMTR) 222 to provide a corresponding RF modulated signal. The $N_T$ modulated signals from transmitters 222a through 222t then transmitted from $N_T$ antennas 224a through 224t.

At receiver system 250, the $N_T$ transmitted signals are received by $N_R$ antennas 252a through 252r. Each receiver (RCVR) 254 processes a received signal from an associated antenna 252 to provide a corresponding received symbol stream. A receive (RX) spatial processor 260 then processes the $N_R$ received symbol streams from $N_R$ receivers 254a through 254r to provide $N_D$ "recovered" symbol streams, which are estimates of the $N_D$ data symbol streams transmitted by the transmitter system. The $N_D$ recovered symbol streams are further processed by an RX data processor 270 to obtain decoded data, which is an estimate of the data transmitted by the transmitter system.

RX spatial processor 260 may also derive an estimate of the channel response between the $N_T$ transmit and $N_R$ receive antennas (e.g., based on the pilot symbols). Channel estimation is described in detail in provisional U.S. Patent Application Serial No. 60/438,601, entitled "Pilot Transmission Schemes for Wireless Multi-Carrier Communication Systems," filed Jan. 7, 2003, assigned to the assignee of the present application and incorporated herein by reference. The channel response estimate $\underline{\hat{H}}$ may be used to perform spatial processing or equalization at the receiver. RX spatial processor 260 may further estimate the SNRs of the recovered symbol streams and/or the received pilot symbols. Controller 280 receives the channel response estimate $\underline{\hat{H}}$ and the received SNRs and provides feedback regarding the MIMO channel and/or the streams. For example, the feedback may indicate the number of data symbol streams to transmit, which ones of the spatial channels or eigenvectors to use for data transmission, and the received SNR or rate for each stream. The feedback is processed by a TX data processor 288, further processed by a TX spatial processor 290, conditioned by transmitters 254a through 254r, and sent back to transmitter system 210.

At transmitter system 210, the transmitted modulated signals from receiver system 250 are received by antennas 224, conditioned by receivers 222a through 222t, demodulated by an RX spatial processor 240, and processed by an RX data processor 242 to recover the feedback sent by the receiver system. The feedback is then provided to controller 230 and may be used to (1) determine the number of data symbol streams to transmit, (2) determine the rate and coding and modulation scheme to use for each data symbol stream, and (3) generate various controls for TX data processor 214 and TX spatial processor 220.

Controllers 230 and 280 direct the operation at the transmitter and receiver systems, respectively. Memory units 232 and 282 provide storage for program codes and data used by controllers 230 and 280, respectively.

Figure 3:
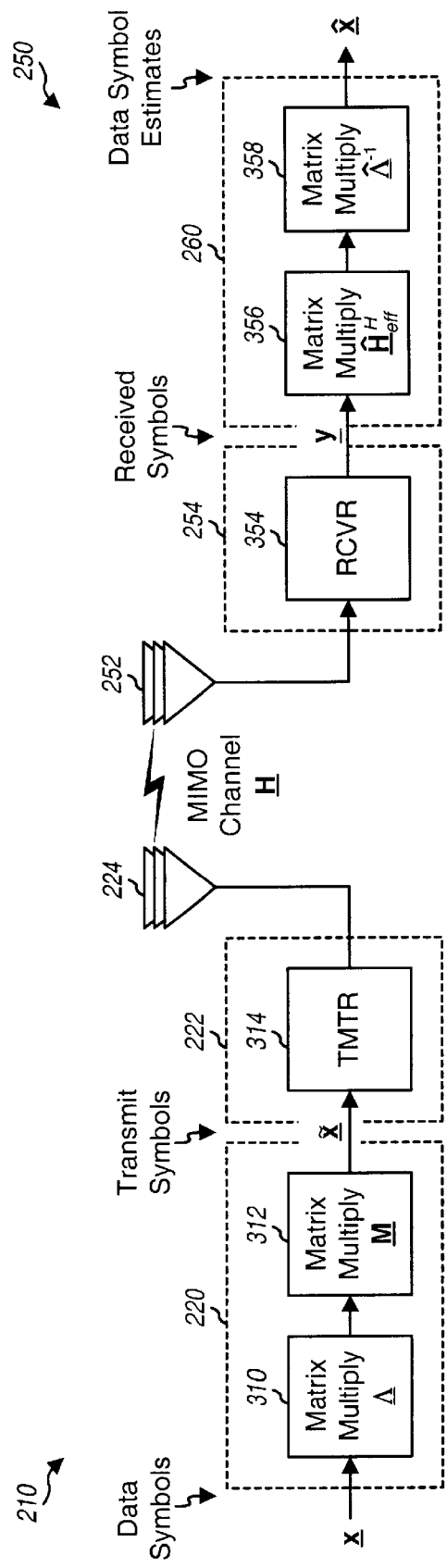
FIG. 3 shows the spatial processing at the transmitter and receiver systems for the rate adaptive transmission scheme.

FIG. 3 shows a block diagram of the spatial processing at the transmitter and receiver systems for the rate adaptive transmission scheme. Within TX spatial processor 220 at transmitter system 210, the data vector $\underline{x}$ is first multiplied with the diagonal matrix $\underline{\Lambda}$ by a unit 310 and then further multiplied with the transmit basis matrix $\underline{M}$ by a unit 312 to obtain the transmit vector $\underline{\tilde{x}}$. The vector $\underline{\tilde{x}}$ is then processed by a transmitter 314 and transmitted over the MIMO channel to receiver system 250. Unit 312 performs the spatial processing for the transmitter system.

At receiver system 250, the transmitted signals are processed by a receiver 354 to obtain the receive vector $\underline{y}$. Within RX spatial processor 260, the receive vector $\underline{y}$ is first multiplied with a matrix $$\underline{\hat{H}}_{eff}^H$$

by a unit 356. An effective channel response estimate matrix $\underline{\hat{H}}_{eff}$ may be obtained as $\underline{\hat{H}}_{eff}=\underline{\hat{H}M}$, and the matrix $$\underline{\hat{H}}_{eff}^H$$

is the conjugate transpose of $\underline{\hat{H}}_{eff}$. The matrix $$\underline{\hat{H}}_{eff}^H$$

is also referred to as the matched filter matrix for the rate adaptive transmission scheme. The resultant vector from unit 356 is further scaled by an inverse diagonal matrix $\underline{\hat{\Lambda}}^{-1}$ by a unit 358 to obtain the vector $\underline{\hat{x}}$, which is an estimate of the data vector $\underline{x}$. Units 356 and 358 perform the spatial processing (i.e., matched filtering) for the receiver system.

Figure 4:
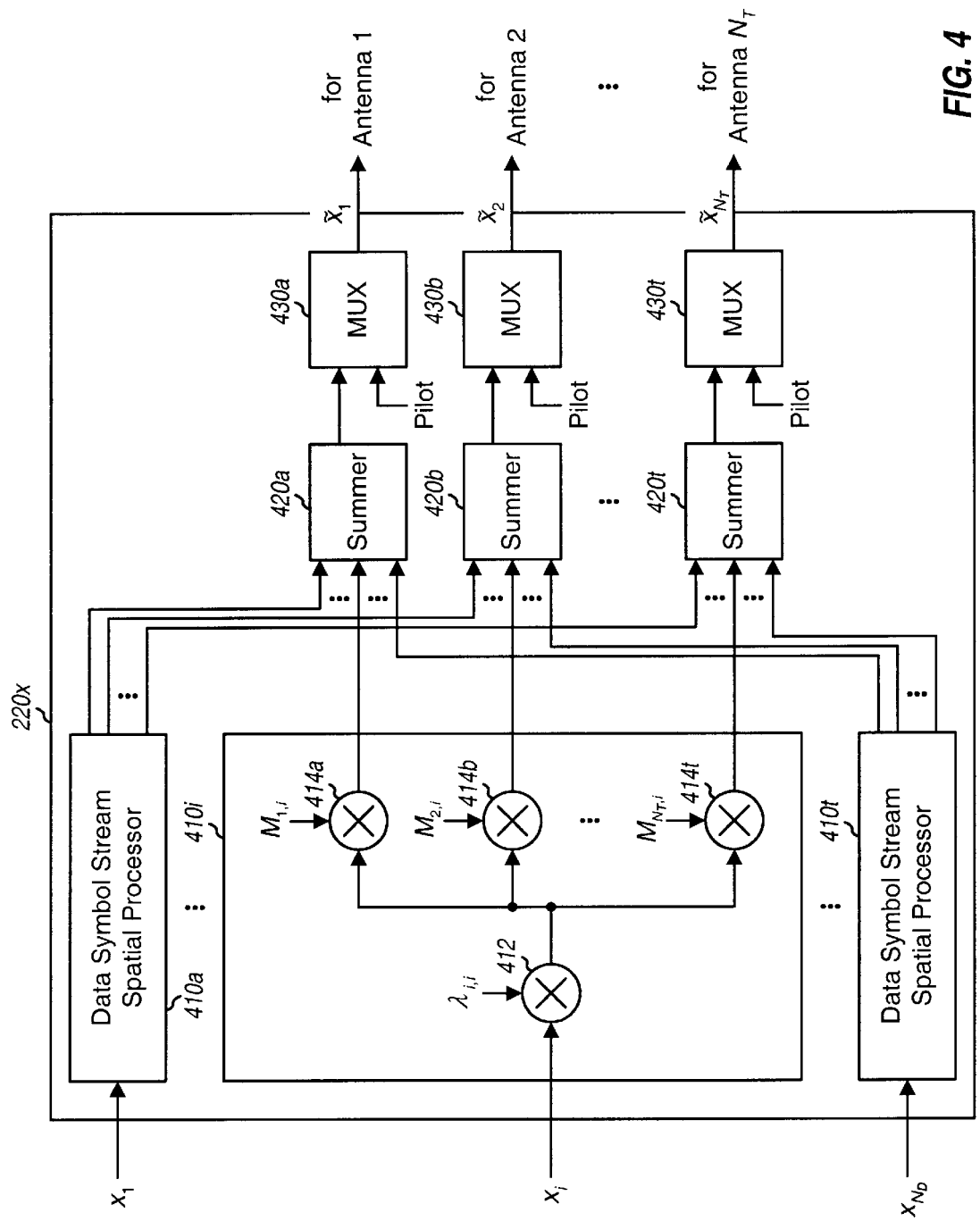
FIG. 4 shows a block diagram of a transmit (TX) spatial processor within the transmitter system.

FIG. 4 shows a block diagram of a TX spatial processor 220x, which is an embodiment of TX spatial processor 220 in FIG. 2. TX spatial processor 220x includes a number of data symbol stream spatial processors 410a through 410t, one processor for each of the $N_D$ data symbol streams to be transmitted. Each processor 410 receives an assigned data symbol stream $x_i$, the weight $\lambda_{i,i}$ for the assigned stream, and a corresponding vector $\underline{m}_i$ from the transmit basis matrix $\underline{M}$.

Within each processor 410, the data symbols in the assigned stream $x_i$ are first scaled with the weight $\lambda_{i,i}$ by a multiplier 412. The scaled data symbols are further multiplied by $N_T$ multipliers 414a through 414t with $N_T$ elements $M_{1,i}$ through $M_{N_T,i}$, respectively, from the vector $\underline{m}_i$. Each data symbol stream $x_i$ is thus transmitted from all $N_T$ antennas and represented by a vector $\underline{\tilde{x}}_i$, which may be expressed as:

$$\underline{\tilde{x}}_i = \underline{m}_i \cdot \lambda_{i,i} \cdot x_i. \qquad \text{Eq(21)}$$

The output symbols from multipliers 414a through 414t are then provided to $N_T$ summers 420a through 420t, respectively, one summer for each transmit antenna. Each summer 420 receives the output symbols for its assigned antenna, which are from $N_D$ multipliers 414 within $N_D$ processors 410 assigned to process the $N_D$ data symbol streams. Each summer 420 then sums the output symbols and provides the transmit symbols for its assigned antenna. The summation performed by each summer 420 may be expressed as:

$$\tilde{x}_k = \sum_{i=1}^{N_D} \tilde{x}_{k,i}, \qquad \text{Eq (22)}$$

where $\tilde{x}_{k,i}$ is the k-th element in the vector $\underline{\tilde{x}}_i$ for the i-th data symbol stream; and $\tilde{x}_k$ is the transmit symbol stream for the k-th transmit antenna.

The transmit symbols from each summer 420 are provided to a respective multiplexer 430 and multiplexed with pilot symbols to provide a stream of multiplexed transmit and pilot symbols for the associated antenna.

The rate adaptive transmission scheme described herein may be used for single-carrier MIMO systems as well as multi-carrier MIMO systems. For a multi-carrier MIMO system, each of the multiple carriers available for data transmission may be viewed as a single-carrier MIMO system. The total transmit power $P_{tot}$ and the per-antenna power $P_{ant}$ may be divided equally (or possibly unequally) among $N_F$ carriers such that $P_{tot\_car} = P_{tot}/N_F$ and $P_{ant\_car} = P_{ant}/N_F$. The rate adaptive transmission scheme may then be applied to each of the $N_F$ carriers with the per-carrier total power constraint of $P_{tot\_car}$ and the per-antenna/carrier power constraint of $P_{ant\_car}$.

The rate adaptive transmission scheme described herein may be implemented by various means at the transmitter and receiver systems. For example, the processing for the rate adaptive transmission scheme may be implemented in hardware, software, or a combination thereof. For a hardware implementation, the elements used to perform the processing at the transmitter and receiver systems may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing for the rate adaptive transmission scheme may be implemented with modules (e.g., procedures, functions, and so on) that perform the functions described herein. The software codes may be stored in a memory unit (e.g., memory units 232 and 282 in FIG. 2) and executed by a processor (e.g., controllers 230 and 280). Each memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing data for transmission in a multiple-input multiple-output (MIMO) communication system, comprising:

receiving at least one stream of data symbols for transmission from a plurality of antennas;

scaling each of the at least one data symbol stream with a respective weight corresponding to an amount of transmit power allocated to the data symbol stream, wherein total amount of transmit power allocated to the at least one data symbol stream is less than or equal to total transmit power available for the system; and processing the at least one data symbol stream with a transmit basis matrix to provide a plurality of streams of transmit symbols, one transmit symbol stream for each of the plurality of antennas, wherein the transmit basis matrix is defined such that each of the at least one data symbol stream is transmitted from the plurality of antennas and each transmit symbol stream is transmitted at or near full power available for the associated antenna.

2. The method of claim 1, wherein the transmit basis matrix is a Walsh-Hadamard matrix.

3. The method of claim 1, wherein the transmit basis matrix is a discrete Fourier transform (DFT) matrix.

4. The method of claim 1, further comprising:

allocating the total transmit power to the at least one data symbol stream, and wherein the weight for each data symbol stream is determined based on the amount of transmit power allocated to the data symbol stream.

5. The method of claim 4, wherein the amount of transmit power allocated to each of the at least one data symbol stream is determined based on channel condition.

6. The method of claim 1, wherein a single data symbol stream is transmitted from the plurality of antennas at or near full power available for each of the plurality of antennas.

7. The method of claim 6, wherein the single data symbol stream is transmitted on a spatial channel associated with a highest received signal quality.

8. The method of claim 1, wherein $N_T$ data symbol streams are transmitted from $N_T$ antennas at or near full power available for each of the $N_T$ antennas, where $N_T$ is an integer greater than one.

9. The method of claim 1, wherein $N_D$ data symbol streams are transmitted from $N_T$ antennas at or near full power available for each of the $N_T$ antennas, where $N_T$ is an integer greater than one and $N_D$ is an integer less than or equal to $N_T$.

10. The method of claim 1, wherein a variable number of data symbol streams is transmitted based on channel condition.

11. The method of claim 1, wherein each of the at least one data symbol stream is associated with a particular rate determined based at least in part on a received signal quality for the data symbol stream.

12. The method of claim 1, further comprising:
multiplexing pilot symbols in each of the plurality of transmit symbol streams.

13. A method of processing symbols for transmission in a single-carrier multiple-input multiple-output (MIMO) communication system, comprising:
receiving at least one stream of data symbols for transmission from a plurality of antennas;
allocating total transmit power available for the system to the at least one data symbol stream, wherein total amount of transmit power allocated to the at least one data symbol stream is less than or equal to the total transmit power;
scaling each of the at least one data symbol stream with a respective weight corresponding to an amount of transmit power allocated to the data symbol stream; and
processing the at least one scaled data symbol stream with a transmit basis matrix to provide a plurality of streams of transmit symbols, one transmit symbol stream for each of the plurality of antennas, wherein the transmit basis matrix is defined such that each of the at least one data symbol stream is transmitted from the plurality of antennas and each transmit symbol stream is transmitted at or near full power available for the associated antenna.

14. A method of processing symbols received in a multiple-input multiple-output (MIMO) communication system, comprising:
obtaining a plurality of streams of received symbols for a plurality of receive antennas, wherein the plurality of received symbol streams comprise at least one stream of data symbols having been processed with a transmit basis matrix to form a plurality of streams of transmit symbols for a plurality of transmit antennas, wherein the transmit basis matrix is defined such that each of the at least one data symbol stream is transmitted from the plurality of transmit antennas and each transmit symbol stream is transmitted at or near full power available for the associated transmit antenna; and
processing the plurality of received symbol streams to recover the at least one data symbol stream.

15. The method of claim 14, wherein the processing includes
equalizing the plurality of received symbol streams to obtain an estimate of the at least one data symbol stream, and
decoding the estimate of the at least one data symbol stream.

16. The method of claim 15, wherein the equalizing is performed based on a matched filter matrix that comprises the transmit basis matrix.

17. The method of claim 14, further comprising:
estimating a received signal quality for each of the at least one data symbol stream; and
determining a rate for each of the at least one data symbol stream based on the estimated received signal quality.

18. A transmitter apparatus in a multiple-input multiple-output (MIMO) communication system, comprising:
means for receiving at least one stream of data symbols for transmission from a plurality of antennas;
means for scaling each of the at least one data symbol stream with a respective weight corresponding to an amount of transmit power allocated to the data symbol stream, wherein total amount of transmit power allocated to the at least one data symbol stream is less than or equal to total transmit power available for the system; and
means for processing the at least one data symbol stream with a transmit basis matrix to provide a plurality of streams of transmit symbols, one transmit symbol stream for each of the plurality of antennas, wherein the transmit basis matrix is defined such that each of the at least one data symbol stream is transmitted from the plurality of antennas and each transmit symbol stream is transmitted at or near full power available for the associated antenna.

19. The transmitter apparatus of claim 18, wherein the transmit basis matrix is a Walsh-Hadamard matrix or a discrete Fourier transform (DFT) matrix.

20. A transmitter unit in a multiple-input multiple-output (MIMO) communication system, comprising:
a transmit (TX) data processor operative to process data to provide at least one stream of data symbols for transmission from a plurality of antennas; and
a TX spatial processor operative to scale each of the at least one data symbol stream with a respective weight corresponding to an amount of transmit power allocated to the data symbol stream, and to process the at least one data symbol stream with a transmit basis matrix to provide a plurality of streams of transmit symbols, one transmit symbol stream for each of the plurality of antennas, wherein the transmit basis matrix is defined such that each of the at least one data symbol stream is transmitted from the plurality of antennas and each transmit symbol stream is transmitted at or near full power available for the associated antenna.

21. The transmitter unit of claim 20, further comprising:
a plurality of transmitters associated with the plurality of antennas, each transmitter operative to process a respective transmit symbol stream for transmission from the associated antenna.

22. A receiver apparatus in a multiple-input multiple-output (MIMO) communication system, comprising:
a receive (RX) spatial processor operative to process a plurality of streams of received symbols to provide an estimate of at least one stream of data symbols, wherein the at least one data symbol stream is processed with a transmit basis matrix to form a plurality of streams of transmit symbols for a plurality of transmit antennas, and wherein the transmit basis matrix is defined such that each of the at least one data symbol stream is transmitted from the plurality of transmit antennas and each transmit symbol stream is transmitted at or near full power available for the associated transmit antenna; and
an RX data processor operative to process the estimate of at least one stream of data symbols to provide decoded data.

* * * * *